March 17, 1931.　　　R. W. PEARSON　　　1,796,533
ENDLESS TRACTION DEVICE
Filed July 12, 1927　　2 Sheets-Sheet 1
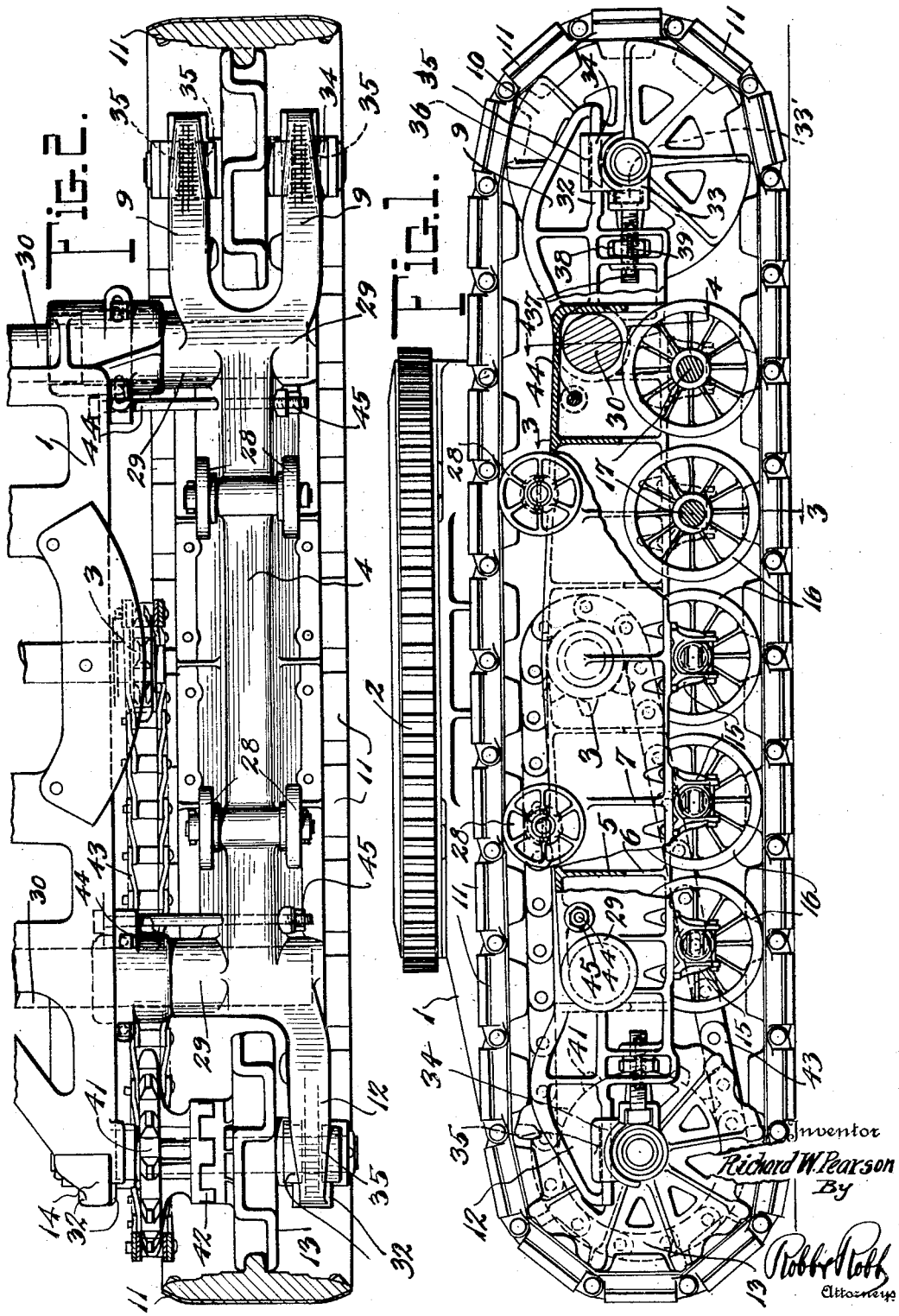

March 17, 1931.    R. W. PEARSON    1,796,533
ENDLESS TRACTION DEVICE
Filed July 12, 1927    2 Sheets-Sheet 2
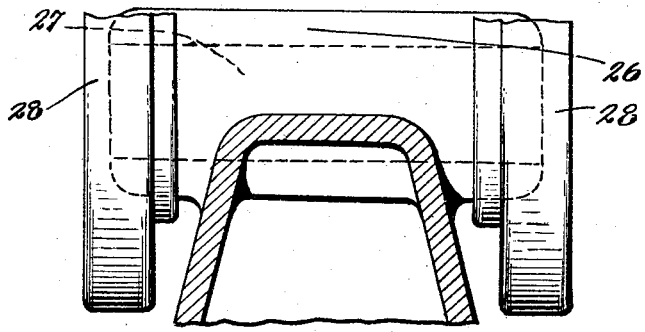
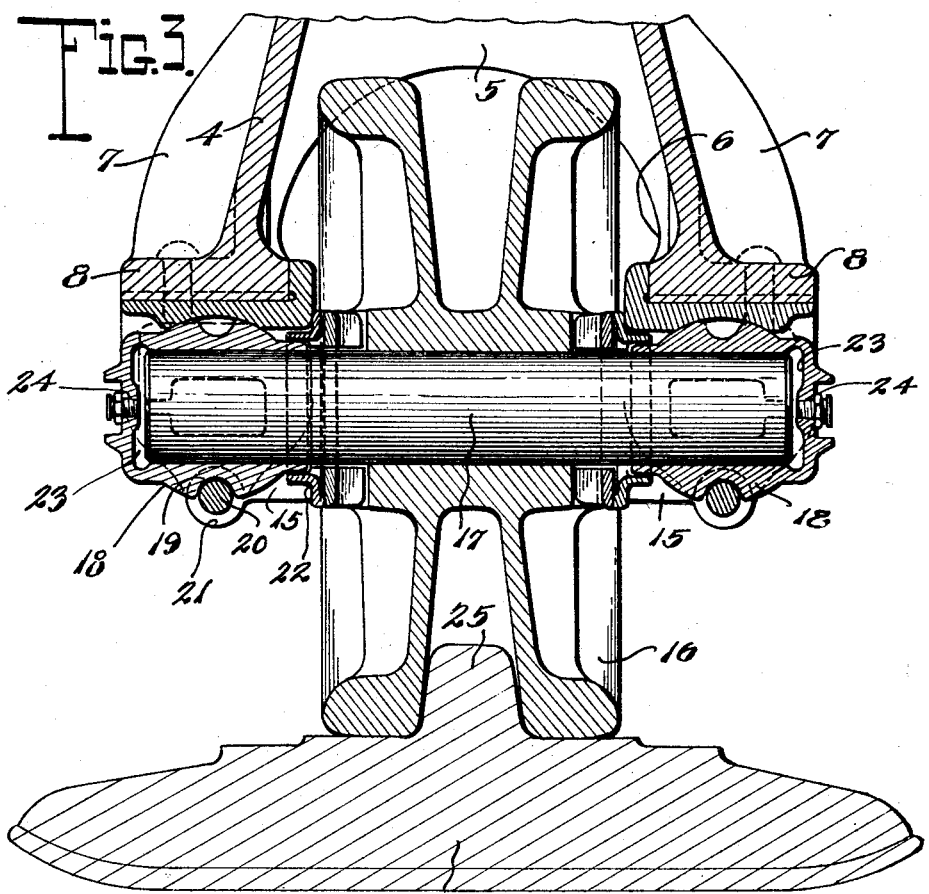
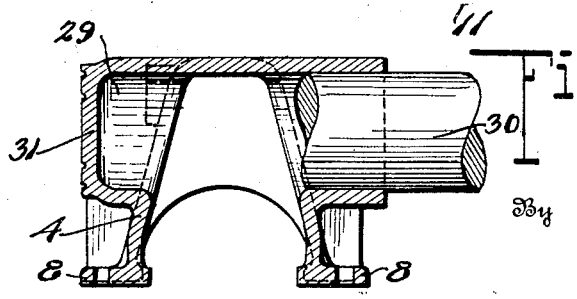
Inventor
Richard W. Pearson
By Robb & Robb
Attorneys Patented Mar. 17, 1931

1,796,533

UNITED STATES PATENT OFFICE

RICHARD W. PEARSON, OF MILWAUKEE, WISCONSIN, ASSIGNOR TO KOEHRING COMPANY, OF MILWAUKEE, WISCONSIN, A CORPORATION

ENDLESS-TRACTION DEVICE

Application filed July 12, 1927. Serial No. 205,183.

In endless track structures for shovel, paver, derrick and other crane carriages, accessibility and availability for repair and interchange of parts have not been heretofore especially accentuated, due to the necessity for first consideration of the care of enormous load stress and the supply and distribution of power.

The present invention comprehends improvements in such trucks, and particularly those of the multiplane type, and has as its primary objects accessibility, ease of repair, and replacement of parts.

In carrying out these and other objects, as will become in part apparent and in part be stated hereinafter, a crane-body supporting truck incorporating the present invention is distinguished from known forms of such trucks both in the structure and the mounting of the side frame or endless track mechanisms, for, at one and the same time, effectively distributing driving and load stress and enabling ready and easy detachment and replacement of parts, or the whole of either or both side frame structures.

The invention also comprehends the combination including the body or crane supporting structure, of an endless track truck, and side frames so connected thereto as to be readily bodily removable by the disconnection of a minimum number of anchorages; and the invention is also characterized by provision of means cooperating in such a combination to facilitate ready engagement and disengagement of the power delivering elements.

In the accompanying drawings:

Figure 1 is a view in side elevation of an endless track crane-truck incorporating an embodiment of the invention, the crane superstructure being omitted, and parts being broken away and seen in section.

Figure 2 is a top plan of one of the side frames and a fragment of the body of the truck seen in Figure 1, the endless track tread being seen in section.

Figure 3 is a transverse, vertical section taken on the plane indicated by line 3—3 of Figure 1, the parts being seen on an enlarged scale.

Figure 4 is a detailed section taken on the plane indicated by line 4—4 of Figure 1, the bearing roller and its pedestals being omitted, parts being seen in elevation.

Referring to the drawings by numerals, 1 indicates the body of an endless track power truck provided with the usual ring gear 2, adapted to be engaged by the customary swinging gear, not illustrated, for the swinging of the crane body or other superstructure mounted on the turn table of the body 1. It is understood, of course, that in mechanism of the character referred to it is customary for the power plant to be arranged within the crane body or other superstructure, not illustrated, and the power to be delivered through the hollow pivot or turning pin arranged axially of the ring gear, whereby power is delivered to appropriate jack shafts terminating each in a power distributing sprocket 3. Since the features thus far mentioned are all old and well known, they have been referred to only for purpose of identification and are not illustrated in the drawings, except the power delivering sprocket 3.

At each side of the body 1 is arranged an endless track unit which, in accordance with the present invention, is designed to be readily assembled with and connected to the body 1, and as easily detached therefrom for increasing available accessibility to parts and facilitating repair and replacement thereof. Each of said endless track units includes a side frame designated generally by the reference numeral 4, and formed with various distinctive features separately hereinafter named. Said side frame 4 may be otherwise constructed, but is preferably produced in the form of a unitary casting in which the body of the frame assumes an inverted, relatively deep trough-shape in cross section, as clearly seen from Figures 3 and 4, with the upper edge of the trough rounded and the side webs or plates of the trough inclined and somewhat simulating an upper case letter A, with the cross bar thereof omitted. This hollow form provides at once space for the operating parts and protection against falling dirt and other foreign substance from the moving treadplates of the returning lap of the endless track. The main side plates or webs of each side frame 4 are preferably connected at intervals by cross webs 5 terminating in fillets 6, and said side webs of frame 4 are strengthened by exteriorly arranged ribs 7, 7, formed integral with said side plates of frame 4 and with the lower marginal flanges 8, 8 thereof. At the forward end of each side frame 4, the frame is bifurcated to produce a yoke, as clearly seen in Figure 2, each bifurcation providing an over-hanging saddle 9, adapted to be mounted on the axle box of the forward sprocket 10 of the endless track 11, the specific construction of the mounting being hereinafter described in detail. The rear end of each side frame 4 terminates in a single furcation, providing a saddle 12, corresponding in form, arrangement, and function to the outer saddle 9 of the forward end, but mounted on the box of the driver sprocket 13 of the endless track 11, the box for the opposite extremity of the shaft or axle of the respective driver sprocket 13 receiving the load stress directly from the body 1 through the saddle 14 co-operating with the saddle 12, to produce a yoke structure at the rear end of the frame 4. Saddle 14 in each instance is either formed integral with or appropriately fixed to body 1.

Fixed to and depending from the webs 8 of the frame 4 are pedestals 15, 15, said pedestals being arranged in pairs, one pendant from the outer and one from the inner flange 8 for each of the series of load stress distributing wheels or rollers 16. Each wheel or roller 16 is fixed on an axle or shaft 17 which has its terminals journalled in the respective pairs of pedestals 15. The journal bearing in each pedestal is susceptible of various modifications of construction, one form being seen in detail in Figure 3, consisting of a bearing sleeve 18 surrounding the respective journal end of the respective shaft 17 and peripherally grooved at 19 to receive a retaining bolt 20, which is extended beneath the bearing sleeve 18 in said groove and passed through eyes 21, 21 at the lower free ends of the pedestals 15. An appropriate dust guard 22 surrounds each axle 17 at each side of the respective wheel 16, and is flanged to enclose the inner terminal portion of the respective bearing sleeve 18. Each sleeve 18 is closed at its outer end with a preferably integral cover plate, located to leave a lubricant receiving space 23, the cover plate being apertured at 24 for the introduction of lubricating material and the aperture 24 being closed by a threaded plug or other appropriate sealing means. Each wheel 16 is peripherally grooved, as customary in structures of this type, to receive the usual web or flange 25 of each of the several treads of the endless track 11.

Each of the frames 4 is preferably formed with transverse sleeves 26 at its upper portion, as many such sleeves being employed as desired, each providing a bearing for a shaft 27 carrying the idler roller 28 at each end, located to engage the under surface of the return or upper reach of the endless track 11 for preventing sagging of the return lap of said endless track.

Each side frame 4, preferably adjacent each end thereof, is provided with a socket 29 arranged transversely through the upper portion of the frame 4 to receive the projecting end portion of an axle 30. The socket 29 is sleeve like and closed at its outer end by cover plate 31, and the axle 30 in each instance is a shaft of the dead-axle type since it functions for load stress distribution and not as either a rotating member or a pivot of rotation. Each axle 30 extends across the respective end portion of the main body 1 and is appropriately anchored thereto, so that only the terminal portions outstand laterally in position for occupying the respective sockets 29 when the side frames are in their operative relation to the body 1.

Each of the saddles 9, 12 and 14 is provided with a pair of laterally outstanding flanges 32, bordering the lower edge of the respective saddle, and the bearing box 33 for the stub shaft of the respective sprocket 10 or 13 is provided with a pair of upstanding flanges 34 extending past the respective flanges 32 and each formed with an overhanging lip 35 overlying the respective flange 32, so that an under cut groove is provided as a part of the construction of each bearing box 33, forming a guide way for the engaged portion of the respective saddle 9, 12 or 14. Each bearing box 33 engages its respective end of the given shaft in the usual manner and is provided with a boxing 33' open at its upper end and slotted at 36 to receive an adjusting screw threaded shaft 37. Each shaft 37 extends from the respective boxing 33' through appropriate webs in the saddle portion of the respective frame 4 or of the saddle 14, as the case may be, and is engaged by an adjusting nut 38 between such webs for enabling and facilitating shifting of the sprockets 10 and 13 longitudinally relatively to the frame for tensioning the endless track web 11. Each of the nuts 38 is preferably locked against rotation by a detachably mounted bolt 39 extending through the webs of the respective part between which the given nut 38 is mounted, each nut 38 being provided with a series of radial notches proportioned to accommodate the respective bolt 39.

A chain sprocket 41 is mounted on the shaft of each sprocket 13 and is permanently connected to the respective sprocket during use by a jaw clutch 42, whereby power is adapted to be delivered to sprocket 13 through a sprocket chain 43 to sprocket 41 and thence through clutch 42 to sprocket 13 and to the endless track 11.

It will be thus seen that each of the endless track side units is a complete organization in itself, adapted for ready application to and removal from the body 1 without altering the conditions of the body or the mechanism thereof and with the greatest ease and facility. As a means, however, of effectively retaining the said side units or endless track units in proper relation to the body 1, anchoring rods 44 are preferably employed.

When the parts are assembled as shown in the drawings, if it becomes desirable to repair or replace a part difficult of access, it is only necessary to relieve the respective terminals of axles 30 from the weight of the body 1 in the superstructure, as by jacking up the parts, and then remove the nuts 45 and the collar on the end of driver sprocket shaft, and thereupon the complete endless track side unit may be withdrawn laterally, the sockets or sleeves 29 moving off of the projecting end portion of axle 30, and the clutch 42 opening for allowing the said withdrawal.

As stated, the anchorage of one end of the shaft for the driver sprocket 13 must be detached to permit this withdrawal, and to facilitate this action the sprocket 41 is mounted, in each instance, after the manner of the drive wheel of an automobile, having a full floating axle, whereby the sprocket remains in position on its supporting sleeve or hub when the shaft of the respective driving sprocket 13 is withdrawn from the journalled boxing of the respective saddle 14.

To reassemble requires but a reversal of the actions stated, the frame 4 being moved laterally in position against the body 1, the sleeves or sockets 29 slipping over the projecting end portions of axles 30 and the bolts or rods 44 being moved through the apertures of the frame 1 prepared therefor. The nuts 45 are then replaced. When the connections for the shaft of driving sprocket 13 are applied at the boxing of the respective saddle 14, the parts are ready for use.

As clearly seen in Figure 1, each side frame 4 is divided by the webs 5 into compartments and the wheels or rollers 16 are located for having their peripheries extend up into such compartments, so that the frame has its side web effectively braced between each two of the rollers 16. It will also be noted from Figures 1 and 3 that the ribs 7 are each arranged in the line of the axis of one of the rollers 16, so that the several ribs 7 effectively distribute the load stresses from the frame to the axles of said rollers.

Having thus described my invention, what I claim as new and desire to secure by Letters Patent of the United States is:

1. The combination, with the body of a tractor having outstanding dead-axles, of an endless traction frame unit having means for laterally receiving said axles, and means independent of the axles for detachably retaining said unit against lateral movement relative to said body.

2. In an endless traction device, the combination with a truck body, of an endless traction frame detachably anchored to said body and detachable from and replaceable on said body as a unit, the truck body having laterally outstanding supporting axles, and the endless traction frame having corresponding sockets for laterally receiving said axles, and means independent of the sockets and axles for retaining the endless traction frame and truck body against relative withdrawal movement of either with respect to the other.

3. In an endless traction device, the combination with a truck body, of an endless traction side unit, means on the truck body and endless traction side unit whereby said side unit is slidably engaged with the truck body, and instrumentalities, independent and separate from the last named means, for retaining the aforementioned parts in their engaged relationship.

4. The combination with the body of a tractor having outstanding dead axles, of an endless track frame unit having means for laterally receiving said axles, and bolt and nut means independent of the axles for detachably retaining said unit against lateral movement relative to said body.

5. The combination with the body of a tractor having outstanding dead axles, of an endless track frame unit having means for laterally receiving said axles, and bolt and nut means independent of the axles for detachably retaining said unit against lateral movement relative to said body, the shanks of said bolts extending from said body through said unit, and the nuts being applied to the ends of said shanks outside the unit, whereby said nuts are easily accessible and displaceable for the expeditious securement and removal of said unit.

In testimony whereof I affix my signature.

RICHARD W. PEARSON.